March 12, 1963 R. F. SCHMOOCK 3,081,423
DAMPING CONTROL FOR REBALANCING MOTORS
Filed March 20, 1961
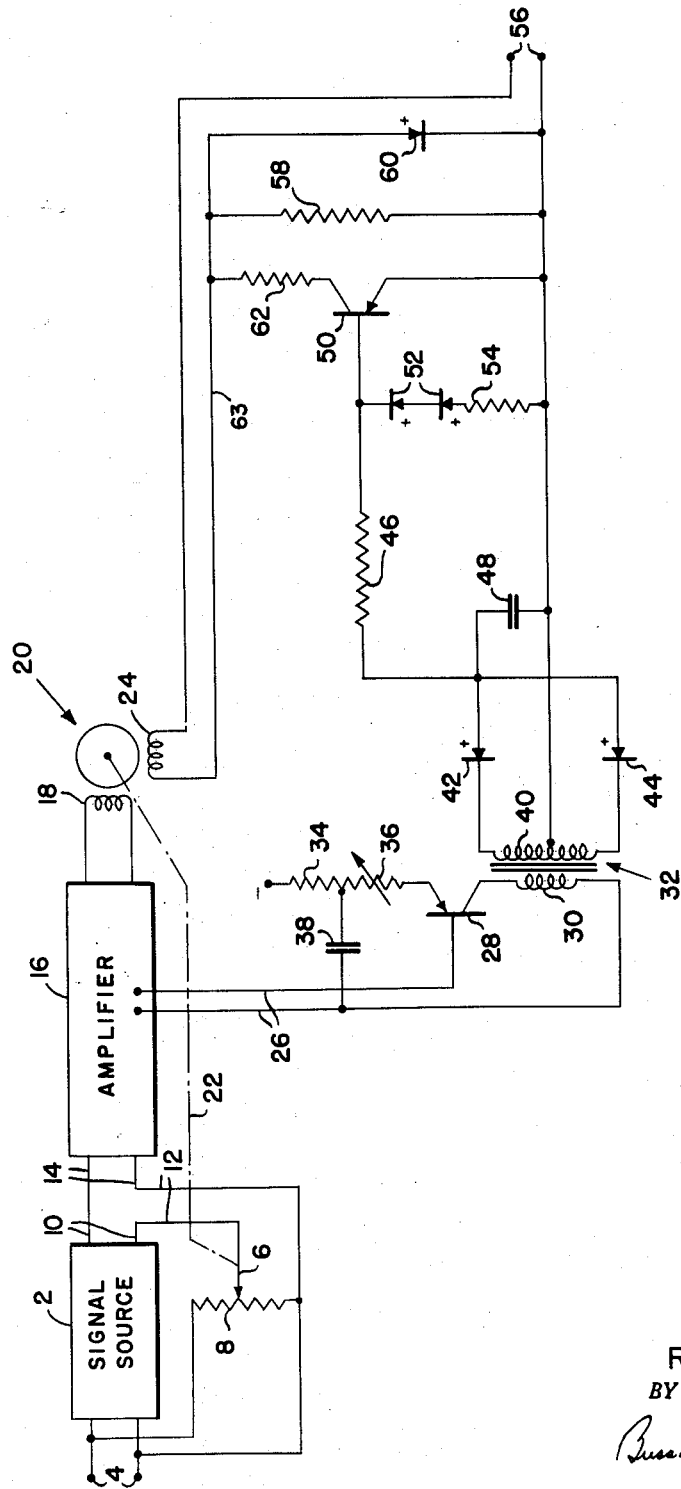
INVENTOR.
ROY F. SCHMOOCK
BY
ATTORNEYS

# United States Patent Office 3,081,423
Patented Mar. 12, 1963

3,081,423
DAMPING CONTROL FOR REBALANCING MOTORS
Roy F. Schmoock, Ivyland, Pa., assignor to Fischer & Porter Company, Warminster, Pa., a corporation of Pennsylvania
Filed Mar. 20, 1961, Ser. No. 97,024
8 Claims. (Cl. 318—448)

This invention relates to a damping control circuit for balancing motors of the type used in indicators, recorders, and controllers.

In indicating, recording and control apparatus involving motor-energized rebalancing systems, there always exists the problem of securing rapid response without attendant hunting. Numerous systems have been devised for this purpose, the simpler of which involve merely the provision for damping of the balancing motor. Simple damping, however, will slow down response to an objectionable extent even when the error signal is large. Accordingly, systems have been devised which are effective primarily or solely when the error signals become small and, therefore, indicative of approaching balance. The systems employed for accomplishing this result are usually complex, and frequently require the presence of auxiliary mechanical apparatus such as tachometers, or the like.

The broad object of the present invention is directed to the provision of a damping system which is wholly electrical in nature and simple, reliable and inexpensive. Specifically, use is made of the fact that when an alternating current balancing motor is used having the usual reference and signal-energized windings, damping may be accomplished by the introduction into the reference winding of a direct current which sets up a magnetic field between the stator and the rotor of the motor. In accordance with the invention, such a direct damping current is caused to flow only when the apparatus is near a balanced condition, the damping current being reduced or removed while the error signal remains large and rapidity of response is desired. The direct damping current which is required under unusual circumstances is of low magnitude and hence the control may be effected through the use of a simple transistor circuit.

The foregoing and other objects of the invention particularly relating to details of construction and operation will become apparent from the following description, read in conjunction with the accompanying drawing, in which the single FIGURE is a wiring diagram of a preferred embodiment of the invention.

As will become evident from the following description of operation, the invention is very generally applicable to substantially any type of rebalancing indicator, recorder or controller which involves a balancing motor. The motor may effect balancing by the application of mechanical or other forces, or by positioning elements, or by effecting electrical balance by the operation of a potentiometer, or the like. The invention will be described applied to the last mentioned type of balancing system in which it controls a potentiometer supplying an electrical output which bucks the error signal to provide a net signal which passes through a zero value. Since the magnitude of the net error signal alone is used to control the damping, and this is reflected by the magnitude of a signal from a motor-driving amplifier, the quite universal applicability of the invention may be readily understood, the particular nature of the transducer or other device feeding the amplifier being immaterial.

To provide a background for an understanding of the invention, there is indicated in a conventionalized form a system which may be used for indicating, recording, or control. The signal source 2 may be any type of transducer which is excited from power supply terminals 4 which may be assumed to provide alternating currents at a commercial frequency, though it will be understood that the alternating current which drives the balancing motor may originate at a later point in the system, for example by the chopping of a direct signal, or otherwise. Connected to the same source terminal 4 is a potentiometer 8 having an adjustable contact 6. The output from the signal source 10 and the output from the potentiometer, provided at 12, are in a bucking relationship and the net signal is provided at 14 to an amplifier 16 which supplies alternating current to the control winding 18 of the motor 20 which, through mechanical connection as indicated at 22 will adjust the potentiometer contact 6 to secure balance by zeroizing the amplifier input at 14. The usual reference winding 24 is supplied with alternating current at the same frequency as that supplied to the winding 18, this being supplied from the source 56 later referred to. As is usual, the phase relationship of the currents in the windings determines the direction of rotation of the motor 20. If no damping system was provided, both windings would supply alternating current only. In accordance with the invention a damping direct current component is supplied to the reference winding 24, this direct current component being variable to achieve the purposes of the invention.

For control of the damping system an alternating signal is derived through the leads 26 from the amplifier 16. Usually it will be found, in view of the electrical magnitudes involved, that this signal may be best derived from an intermediate stage of the amplifier 16, most desirably being taken at a point in the amplifier where saturation occurs for low magnitude of the net error signal delivered to the amplifier. In that way overloading of the damping system may be avoided. The signal from the leads 26 is delivered to the transistor 28 which is in a grounded emitter power amplifier circuit arrangement. For purposes of isolation, the output of this amplifier stage is delivered to the primary 30 of a transformer 32, the split secondary 40 of which feeds the full wave rectifier comprising the diodes 42 and 44 and the filter arrangement of capacitor 48 and resistor 46. The gain of the transistor amplifying stage 28 is adjusted by variation of the resistance 36 in the emitter connection, there being also involved the direct current stabilizing arrangement provided by resistor 34 and capacitor 38.

The rectifier arrangement which has been described provides its output between the base and emitter of the transistor 50, as shown. The collector of this transistor is connected through resistor 62 to the line 63 running to a terminal of the reference winding 24. The upper of the terminals 56 is connected to the other terminal of the reference winding. The lower terminal 56 is connected to the emitter of the transistor 50, and is connected to the line 63 through both a resistor 58 and a diode 60 in parallel with this resistor. In a typical arrangement, the transistor 50 may be of the type 2N1008B, the diode 60 may be of the type CER-69, and the resistor 58 may have a value of 1000 ohms. The resistor 62 may have a typical value of 100 ohms, and is provided solely to keep the current through the transistor at a value not exceeding the dissipation rating of the transistor.

The two diodes 52 in series with each other and with the resistor 54 are arranged between the base and the emitter of the transistor to provide temperature compensation. These diodes may be of the type 1N2326, with the resistor 54 having a value of 470 ohms.

The operation of what has been described is as follows:
Assuming a line voltage of approximately 115 ohms A.C. at terminals 56, it will be noted that the reference winding 24 is in series with three parallel connections: one of them through the diode 60, a second through the resistor 58, and a third through the collector and emitter of the transistor 50. The resistor 58 is of a value providing the desired alternating reference current through the reference winding 24. The desired operation depends on the joint action of the other two parallel current paths.

When a zero signal is introduced to the leads 26 corresponding to a balance of the preceding circuit involving a zero net input to the amplifier 16, there is no current introduced through the rectifier which includes the diodes 42 and 44, and the base of the transistor 50 is at the same potential as its emitter. The transistor, then, is cut off, so that no current flows through resistor 62 and the transistor collector. The diode 60, however, conducts on the positive half cycles appearing at the upper terminals 56, and by its rectifying action a direct current then flows through the reference winding 24. The result is a maximum damping direct current which slows down the slewing speed of the motor, typically to a value of about one-fifth of its normal slewing speed which occurs when the damping direct current is absent. However, if a greater than zero output occurs through the leads 26, representing a deviation from balance, the rectifier receives an alternating supply and provides a negative potential to the base of the transistor 50, the value of which depends upon the magnitude of the alternating input. Under such conditions the transistor 50 becomes conductive to an extent depending upon the magnitude of the direct bias thus applied. It will then conduct during the negative excursion of the potential of the upper terminal 56 so that as the negative bias of the base increases, the transistor 50 in conjunction with the diode 60 will pass an increasing negative half wave with respect to the positive half wave passed by the diode 60. This means that the combination serves to pass an increasing alternating current but proportionately a decreasing direct current to flow through the reference winding 24. As this direct current decreases the damping action decreases and the motor speed will increase. Ultimately, the transistor 50 will become substantially as conductive as the diode 60, and when this situation is reached there will be substantially no direct component passing through the winding 24, the positive and negative half cycles being equal so that the result is the passage of the full alternating wave. The increase in alternating current through the winding 24 has, of course, little effect on the motor speed.

Adjustments are desirably so made (by variation of resistor 36) that the variation of action of the transistor 50 from cut-off to maximum current flow takes place in a limited region about the balance point, typically, for example, between zero and 2 to 5% of the full range of the scale of the apparatus. In other words, when the deviation from balance is more than 2 to 5% of full scale, the direct damping current is effectively removed and the motor operates at full speed. However, when the deviation from balance is in the small range near balance an increasing direct damping current flows to reach a maximum when balance is achieved. Thus, damping is provided only in the region of operation where it is required to prevent hunting.

Specifically, the desired action is achieved by choice of components as indicated above, by adjustment of resistor 36, and derivation of the signals on leads 26 from a point of the amplifier at which saturation occurs. The alternating half waves passed by the transistor are then substantially equal in magnitude to those passed by the diode 60 for all net unbalanced inputs to the amplifier exceeding those for which damping is desired, so that D.C. damping current is substantially eliminated for such unbalanced inputs.

The adjustments of resistor 36, controlling the gain of transistor stage 28, together with preselection of the other constants of the system makes it possible to achieve, in effect, ranges of damping which correspond to a range from under-damping through critical damping to over-damping. The adjustment, of course, depends upon the inertia of the motor and its associated parts.

It will now be evident that in accordance with the foregoing there is provided a damping system without mechanical parts and of simple construction and having ease of adjustment. Reliability is achieved through the use of elements of substantially permanent life and not subject to mechanical or electrical deterioration in use.

What is claimed is:

1. In combination, signal input terminals, a motor having control and reference windings and of a type having its direction of operation determined by the phase relationship of alternating currents in said windings, means receiving signals from said input terminals and supplying alternating current to said control winding of the motor, means controlled by the motor to vary signals at said input terminals, means supplying alternating current to said reference winding, and means responsive to the signals at said input terminals to provide to said reference winding a damping direct current varying in inverse relationship to the magnitude of said signals, said last mentioned means comprising, in series with said reference winding and said means supplying alternating current thereto, a parallel arrangement of a resistor, a rectifying diode and a rectifying element and means through which said signals control said element, said diode and element being oppositely polarized to block respectively the successive half waves of the last mentioned alternating current.

2. In combination, signal input terminals, a motor having control and reference windings and of a type having its direction of operation determined by the phase relationship of alternating currents in said windings, means receiving signals from said input terminals and supplying alternating current to said control winding of the motor, means controlled by the motor to vary signals at said input terminals, means supplying alternating current to said reference winding, and means responsive to the signals at said input terminals to provide to said reference winding a damping direct current having a substantial value when said signals are small and an ineffective value as said signals increase beyond a predetermined magnitude, said last mentioned means comprising, in series with said reference winding and said means supplying alternating current thereto, a parallel arrangement of a resistor, a rectifying diode and a rectifying element, and means through which said signals controls said element, said diode and element being oppositely polarized to block respectively the successive half waves of the last mentioned alternating current.

3. In combination, signal input terminals, a motor having control and reference windings and of a type having its direction of operation determined by the phase relationship of alternating currents in said windings, means receiving signals from said input terminals and supplying alternating current to said control winding of the motor, means controlled by the motor to vary signals at said input terminals, means supplying alternating current to said reference winding, and means responsive to the signals at said input terminals to provide to said reference winding a damping direct current varying in inverse relationship to the magnitude of said signals, said last mentioned means comprising, in series with said reference winding and said means supplying alternating current thereto, a parallel arrangement of a resistor, a rectifying diode and a transistor, and means through which said signals control said transistor, said diode and transistor being oppositely polarized to block respectively the successive half waves of the last mentioned alternating current.

4. In combination, signal input terminals, a motor having control and reference windings and of a type having its direction of operation determined by the phase relationship of alternating currents in said windings, means receiving signals from said input terminals and supplying alternating current to said control winding of the motor, means controlled by the motor to vary signals at said input terminals, means supplying alternating current to said reference winding, and means responsive to the signals at said input terminals to provide to said reference winding a damping direct current having a substantial value when said signals are small and an ineffective value as said signals increase beyond a predetermined magnitude, said last mentioned means comprising, in series with said reference winding and said means supplying alternating current thereto, a parallel arrangement of a resistor, a rectifying diode and a transistor, and means through which said signals control said transistor, said diode and transistor being oppositely polarized to block respectively the successive half waves of the last mentioned alternating current.

5. In combination, signal input terminals, a motor having control and reference windings and of a type having its direction of operation determined by the phase relationship of alternating currents in said windings, means receiving signals from said input terminals and supplying alternating current to said control winding of the motor, means controlled by the motor to vary signals at said input terminals, means supplying alternating current to said reference winding, and means responsive to the signals at said input terminals to provide to said reference winding a damping direct current varying in inverse relationship to the magnitude of said signals, said last mentioned means comprising, in series with said reference winding and said means supplying alternating current thereto, a parallel arrangement of a resistor, a rectifying diode and a rectifying element, and means through which said signals control said element, said diode and element being oppositely polarized to block respectively the successive half waves of the last mentioned alternating current, the means through which said signals control said element comprising a rectifier for said signals providing a direct potential controlling said element.

6. In combination, signal input terminals, a motor having control and reference windings and of a type having its direction of operation determined by the phase relationship of alternating currents in said windings, means receiving signals from said input terminals and supplying alternating current to said control winding of the motor, means controlled by the motor to vary signals at said input terminals, means supplying alternating current to said reference winding, and means responsive to the signals at said input terminals to provide to said reference winding a damping direct current having a substantial value when said signals are small and an ineffective value as said signals increase beyond a predetermined magnitude, said last mentioned means comprising in series with said reference winding and said means supplying alternating current thereto, a parallel arrangement of a resistor, a rectifying diode and a rectifying element, and means through which said signals control said element, said diode and element being oppositely polarized to block respectively the successive half waves of the last mentioned alternating current, the means through which said signals control said element comprising a rectifier for said signals providing a direct potential controlling said element.

7. In combination, signal input terminals, a motor having control and reference windings and of a type having its direction of operation determined by the phase relationship of alternating currents in said windings, means receiving signals from said input terminals and supplying alternating current to said control winding of the motor, means controlled by the motor to vary signals at said input terminals, means supplying alternating current to said reference winding, and means responsive to the signals at said input terminals to provide to said reference winding a damping direct current varying in inverse relationship to the magnitude of said signals, said last mentioned means comprising, in series with said reference winding and said means supplying alternating current thereto, a parallel arrangement of a resistor, a rectifying diode and a transistor, and means through which said signals control said transistor, said diode and transistor being oppositely polarized to block respectively the successive half waves of the last mentioned alternating current, the means through which said signals control said transistor comprising a rectifier for said signals providing a direct potential controlling said transistor.

8. In combination, signal input terminals, a motor having control and reference windings and of a type having its direction of operation determined by the phase relationship of alternating currents in said windings, means receiving signals from said input terminals and supplying alternating current to said control winding of the motor, means controlled by the motor to vary signals at said input terminals, means supplying alternating current to said reference winding, and means responsive to the signals at said input terminals to provide to said reference winding a damping direct current having a substantial value when said signals are small and an ineffective value as said signals increase beyond a predetermined magnitude, said last mentioned means comprising, in series with said reference winding and said means supplying alternating current thereto, a parallel arrangement of a resistor, a rectifying diode and a transistor, and means through which said signals control said transistor, said diode and transistor being oppositely polarized to block respectively the successive half waves of the last mentioned alternating current, the means through which said signals control said transistor comprising a rectifier for said signals providing a direct potential controlling said transistor.

References Cited in the file of this patent
UNITED STATES PATENTS

| | | |
|---|---|---|
| 1,911,356 | Earnes | May 30, 1933 |
| 2,489,689 | Wald | Nov. 29, 1949 |
| 2,528,017 | Stanton | Oct. 31, 1950 |
| 2,529,490 | Field | Nov. 14, 1950 |
| 2,586,095 | Roters | Feb. 19, 1952 |